(12) United States Patent
Salter et al.

(10) Patent No.: US 7,628,520 B2
(45) Date of Patent: Dec. 8, 2009

(54) LIGHTING SYSTEM AND METHOD

(75) Inventors: Stuart Salter, White Lake, MI (US); Mahendra Dassanayake, Bloomfield Hills, MI (US); Lynda Fulgenzi, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 11/738,780

(22) Filed: Apr. 23, 2007

(65) Prior Publication Data

US 2008/0259627 A1    Oct. 23, 2008

(51) Int. Cl.
*F21V 8/00* (2006.01)

(52) U.S. Cl. .................... 362/511; 362/555; 362/488

(58) Field of Classification Search ............... 362/488, 362/511, 555
See application file for complete search history.

(56) References Cited

U.S. PATENT DOCUMENTS

| | | | |
|---|---|---|---|
| 5,404,282 A | 4/1995 | Klinke et al. | |
| 5,859,506 A * | 1/1999 | Lemke | 315/308 |
| 6,158,882 A | 12/2000 | Bischoff, Jr. | |
| 6,871,981 B2 | 3/2005 | Alexanderson et al. | |
| 6,924,744 B2 | 8/2005 | Bohlander et al. | |
| 2008/0084196 A1* | 4/2008 | Lacombe et al. | 323/282 |

FOREIGN PATENT DOCUMENTS

| | | |
|---|---|---|
| GB | 2419241 | 4/2006 |
| WO | 2004021744 A1 | 4/2007 |

* cited by examiner

*Primary Examiner*—Laura Tso
(74) *Attorney, Agent, or Firm*—Frank A. MacKenzie; Brooks Kushman P.C.

(57) ABSTRACT

A lighting system and method enables the generation of light in a manner that reduces the generation of electromagnetic interference (EMI) and/or radio frequency interference (RFI). In one embodiment, a light source emits light upon receiving a substantially linear signal that is generated in response to a pulse width modulated (PWM) signal.

20 Claims, 3 Drawing Sheets

LIGHTING SYSTEM AND METHOD

TECHNICAL FIELD

The embodiments described herein relate to a system and method for providing light.

BACKGROUND

Energizing light sources such as light emitting diodes (LEDs) by applying pulse width modulated (PWM) signals is common. The use of pulse width modulation techniques to energize light sources enable a reduction in heat dissipation by the lighting system. However, it is known that the direct application of PWM signals to the light sources may cause electromagnetic interference (EMI) and/or radio frequency interference (RFI). In many cases, EMI and RFI undesirably effects the performance of the lighting system and other adjacent electrical systems.

The embodiments described herein were conceived in view of these and other disadvantages of conventional PWM techniques for energizing light sources.

SUMMARY

The embodiments described herein include a lighting system and method that enables an efficient emission of light while reducing the generation of electromagnetic interference (EMI) and/or radio frequency interference (RFI). The lighting system includes a light source configured to emit light. In one embodiment, the light source may be a light emitting diode (LED). A regulator may be electrically coupled to the light source and be adapted to receive a pulse width modulated (PWM) signal. In response to the PWM signal, the regulator generates a ramp signal that energizes the light source causing the emission of light.

The method of providing light includes generating a PWM signal and receiving the PWM signal at a regulator. The method also includes generating a ramp signal in response to the PWM signal through the use of the regulator. Additionally, the method may include generating a control signal in response to the ramp signal that causes an emission of light from the light source.

BRIEF DESCRIPTION OF THE DRAWINGS

The novel features of the described embodiments are set forth with particularity in the appended claims. These embodiments, both as to their organization and manner of operation, together with further advantages thereof, may be best understood with reference to the following description, taken in connection with the accompanying drawings in which:

DETAILED DESCRIPTION OF THE EMBODIMENT(S)

As required, a detailed description of embodiments are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art.

Figure 1:
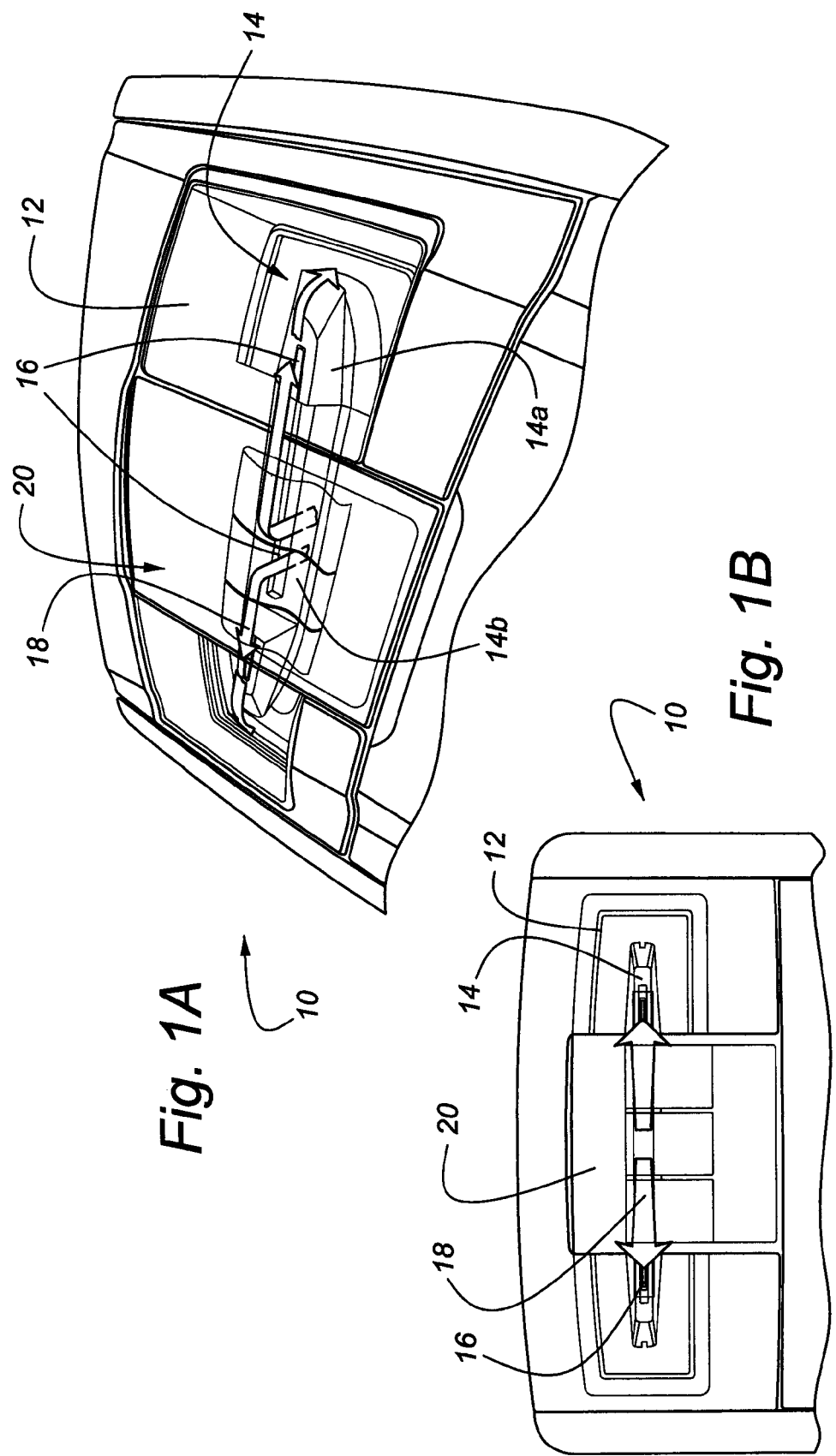
FIGS. 1A and 1B illustrate alternative views of a lighting system in accordance with an embodiment of the present invention.

Referring to FIGS. 1A and 1B, a lighting system 10 is shown. Lighting system 10 may be virtually any type of lighting system including, but not limited to, a lighting system for a vehicle (e.g., a dome light), a lighting system for a building, and the like. The described embodiments enable ambient lighting, conventional vehicle lighting, theater dimming, and the like. However, unlike conventional PWM lighting systems, lighting system 10 enables an efficient emission of light while producing a reduced amount of electromagnetic interference (EMI) and/or radio frequency interference (RFI).

As shown, lighting system 10 includes an outer lens 12 that is optimally positioned on the lighting system 10 to allow the illumination of adjacent areas. In one embodiment, outer lens 12 may be comprised of a translucent or transparent plastic material. Lighting system 10 includes a light guide 14 that guides and/or directs light created by a light source. Light guide 14 includes a raised portion 14a and a lower portion 14b. As shown, light guide 14, including portions 14a and 14b, has openings 16. Openings 16 allow light that is directed by light guide 14 to exit light guide 14. Arrows 18 illustrate how light travels within lighting system 10 as light exits openings 16.

In one embodiment, a switch panel 20 is mounted adjacent to outer lens 12. Switch panel 20 may have one or more buttons that control the illumination of a dome light, a reading light, and the like. It is recognized that the buttons on switch panel 20 may control other functions such as opening a garage door, opening a vehicle door, etc., without departing from the scope of the present invention.

Figure 2:
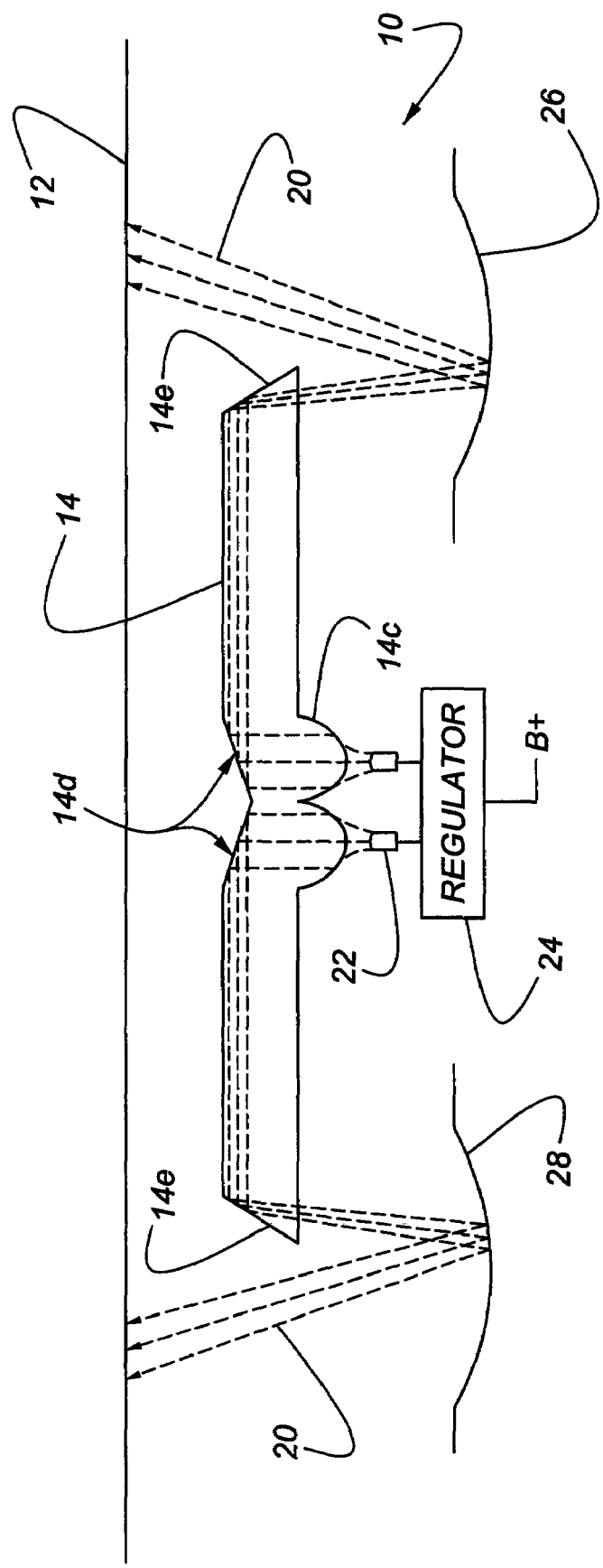
FIG. 2 illustrates a system diagram of the lighting systems illustrated in FIGS. 1A and 1B.

Now referring to FIG. 2, a detailed block diagram of lighting system 10 is provided. Particularly, light guide 14 is shown having a conic section 14c and a reflective edge 14d. As shown, conic section 14c may be implemented as collimating hyperbolic lens. Alternatively, depending upon the position of light source 22, conic section 14c may have an optical configuration that is parabolic.

Arrows 20 illustrate the travel of light from a light source 22 through lens 12. Light source 22, which may be a light emitting diode (LED), emits light onto light guide 14. The emitted light enters light guide 14 and is reflected substantially parallel with light guide 14 by reflective edge 14d. The light reflected by reflective edge 14d is then reflected onto reflective edges 14e. Reflective edges 14e then cause the light to be reflected downward toward reflectors 28 and 26. Reflectors 28 and 26 may have a highly reflective surface and a curved profile that causes the light 20 to be reflected upward so as to traverse lens 12. Although FIG. 2 illustrates light being directed in a specific manner as guided by light guide 14, the present invention contemplates alternative embodiments having other light guide configurations.

Light source 22 may be energized by a regulator 24. In one embodiment, regulator 24 may be coupled to light source 22 through the use of a flexible circuit. Utilizing a flexible circuit improves packaging options for lighting system 10, particularly in space constrained areas. Regulator 24 is also coupled to a power source (B+). In one embodiment, although not necessarily, the B+ source includes a direct current power source, such as a battery, ultra capacitor and the like that is located on a vehicle. As will be described hereinafter, regulator 24 is adapted to generate a ramp signal that causes the energization of light source 22.

Figure 3:
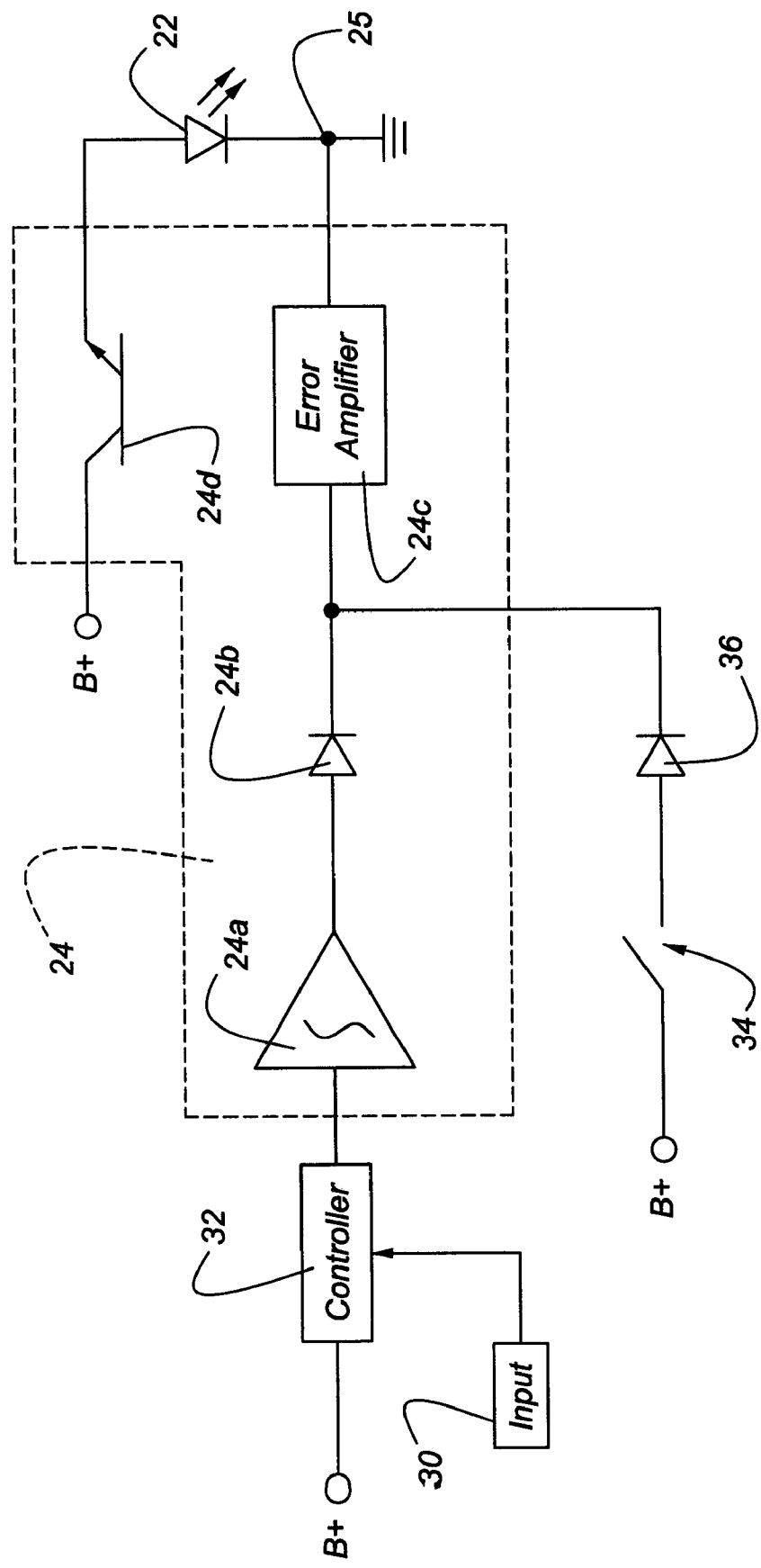
FIG. 3 illustrates a schematic diagram of a regulator that is operable with the lighting systems shown in FIGS. 1A, 1B, and 2.

Referring to FIG. 3, a schematic diagram of regulator 24 along with additional devices is shown. It is recognized that alternative embodiments may have a circuit configuration that differs from that shown in FIG. 3 without departing from the scope of the present invention. Regulator 24 includes an operational amplifier integrator 24a, a diode 24b, an error amplifier 24c, and a switch 24d. In one embodiment, switch 24d may be a transistor. As illustrated, a controller 32 is coupled to the power source (B+) and an input 30. Controller 32 may have data processing and storage capabilities. The power source provides operating power for controller 32.

Controller 32 is adapted to generate PWM signals in response to signals received from input 30. Input 30 may include input signals generated as a response to the opening of a door, signals from a vehicle key fob, or a dome lamp switch. It is recognized that other inputs may be received by a controller 32 in addition to those specifically enumerated depending upon the specific implementation of the described embodiments.

Once the inputs are received by controller 32, controller 32 generates PWM signals having a desired duty cycle and frequency. The PWM signals are received by integrator 24a. Integrator 24a integrates, over time, the PWM signals received from controller 32. The output of integrator 24a may be a ramp signal having a progressively increasing voltage, which propagates through diode 24b. Diode 24b prevents the flow of current towards integrator 24a.

Error amplifier 24c receives the ramp signal as well as any signals from a node 25. The error amplifier 24c assesses the voltages of the ramp signal and any signal received from node 25. Based on the differences in the voltages, error amplifier generates a control signal for switch 24d. As shown, the control signal may be a base current for the transistor implementation of switch 24d that controls the flow of current from a B+ terminal through switch 24d to light source 22. Accordingly, light source 22 is energized in a substantially linear manner without being directly powered by a PWM signal.

A switch 34 and a diode 36, being coupled to the power source, may also be connected to regulator 24. Switch 34 may represent a switch in the vehicle including, but not limited to, a map light switch, a reading light switch, and the like. As such, in one embodiment, switch 34 may be manually engaged by a user. When switch 34 is closed, current flows from the power source (B+) through diode 36. Diode 36 prevents the flow of current in an undesirable direction (e.g., towards switch 34). Error amplifier 24c receives the signal that is transmitted as a result of the closing of switch 34. In response, error amplifier generates a control signal for switch 2d to enable the flow of current across switch 24d thereby energizing light source 22.

While the best mode for carrying out the invention has been described in detail, those familiar with the art to which this invention relates will recognize various alternative designs and embodiments for practicing the invention as defined by the following claims.

What is claimed:

1. A lighting system comprising:
    a light source configured to emit light;
    a regulator being electrically coupled to the light source, the regulator being adapted to receive a pulse width modulated (PWM) signal and generate a ramp signal based on the PWM signal that energizes the light source causing the emission of light; and
    a light guide being positioned in close proximity to the light source, the light guide directing light emitted from the light source.

2. The lighting system of claim 1, wherein the regulator includes:
    a switch adapted to enable the light source to be energized;
    an integrator that receives the PWM signal and generates the ramp signal, wherein the ramp signal is the PWM signal being integrated over time; and
    an amplifier that assesses a voltage of the ramp signal and a voltage of a third signal and, based on differences between the voltage of the ramp signal and the voltage of the third signal, generates a control signal for the switch to enable the light source to be energized causing the emission of light.

3. The lighting system of claim 2, wherein the PWM signal received by the integrator is generated in response to an input from at least one of a key fob, a door, and a dome lamp switch.

4. The lighting system of claim 3, further comprising a controller that receives the input and generates the PWM signal for the integrator.

5. The lighting system of claim 4, further comprising a direct current power source being coupled to the controller that enables the controller to generate the PWM signal upon receiving the input.

6. The lighting system of claim 1, further comprising reflector that reflects the light being directed by the light guide.

7. The lighting system of claim 1, wherein the light guide has a collimating hyperbolic lens.

8. The lighting system of claim 1, further comprising an outer lens that is traversed by the light being directed by the light guide.

9. The lighting system of claim 1, wherein the light source is a light emitting diode (LED).

10. A method of providing light through the use of light source, the method comprising:
    generating a pulse width modulated (PWM) signal;
    receiving the PWM signal at a regulator;
    generating a ramp signal in response to the PWM signal through the use of the regulator; and
    generating a control signal in response to the ramp signal that causes an emission of light from the light source; and
    directing light emitted from the light source through the use of a light guide being positioned in close proximity to the light source.

11. The method of claim 10, wherein the regulator includes:
    an integrator that receives the PWM signal and generates the ramp signal, wherein the ramp signal is the PWM signal being integrated over time; and
    an amplifier that assesses a voltage of the ramp signal and a voltage of a third signal and, based on differences between the voltage of the ramp signal and the voltage of the third signal, generates a control signal for a switch to enable the light source to be energized causing the emission of light.

12. The method of claim 11, wherein the PWM signal received by the integrator is generated in response to an input from at least one of a key fob, a door, and a dome lamp switch.

13. The method of claim 12, further comprising:
    receiving the input at a controller; and
    generating the PWM signal in response to the input for the integrator.

14. The method of claim 13, farther comprising a direct current power source being coupled to the controller that enables the controller to generate the PWM signal upon receiving the input.

15. The method of claim 10, further comprising a reflector that reflects the light being directed by the light guide.

16. The method of claim 10, wherein the light guide has a collimating hyperbolic lens.

17. The method of claim 10, further comprising an outer lens that is traversed by the light being directed by the light guide.

18. A lighting system for a vehicle comprising:
   a controller that receives an input and generates a PWM signal, wherein the input is in response to at least one of a door, a key fob, and a dome light switch;
   a reflector;
   an outer lens;
   a light source configured to emit light; and
   a regulator being in communication with the controller and electrically coupled to the light source, the regulator having:
      a switch adapted to enable energization of the light source,
      an integrator that receives the PWM signal and generates the ramp signal, wherein the ramp signal is the PWM signal being integrated over time, and
      an amplifier that assesses a voltage of the ramp signal and a voltage of a third signal and, based on differences between the voltage of the ramp signal and the voltage of the third signal, generates a control signal for the switch to enable the light source to be energized causing the emission of light.

19. The lighting system of claim 18, further comprising a direct current power source being located on the vehicle and coupled to the controller, the direct current power source enabling the controller to generate the PWM signal upon receiving the input.

20. The lighting system of claim 19, further comprising a light guide having collimating hyperbolic lens being positioned in close proximity to the light source, the reflector and the outer lens, the light guide directing light emitted from the light source onto the reflector, wherein the reflector reflects the light through the outer lens.

* * * * *